United States Patent
Glöckner et al.

(10) Patent No.: US 12,264,738 B1
(45) Date of Patent: Apr. 1, 2025

(54) METHOD FOR ADAPTIVELY DETERMINING A SHIFTING POINT OF A MULTI-GEAR POWERSHIFT TRANSMISSION OF A WORKING MACHINE, CONTROL UNIT, COMPUTER PROGRAM PRODUCT AND WORKING MACHINE

(71) Applicant: ZF FRIEDRICHSHAFEN AG, Friedrichshafen (DE)

(72) Inventors: Rico Glöckner, Pocking (DE); Jan Döring, Passau (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/838,278

(22) PCT Filed: Feb. 14, 2023

(86) PCT No.: PCT/EP2023/053568
§ 371 (c)(1),
(2) Date: Aug. 14, 2024

(87) PCT Pub. No.: WO2023/156361
PCT Pub. Date: Aug. 24, 2023

(30) Foreign Application Priority Data

Feb. 16, 2022 (DE) .................... 10 2022 201 606.8

(51) Int. Cl.
*F16H 61/02* (2006.01)
*E02F 9/20* (2006.01)
(Continued)

(52) U.S. Cl.
CPC ......... *F16H 61/0213* (2013.01); *E02F 9/207* (2013.01); *E02F 9/2079* (2013.01);
(Continued)

(58) Field of Classification Search
CPC ...... F16H 61/0213; F16H 59/44; F16H 59/50; F16H 2061/0087; F16H 2061/0223; E02F 9/207; E02F 9/2079
See application file for complete search history.

(56) References Cited

U.S. PATENT DOCUMENTS

| | | | |
|---|---|---|---|
| 4,939,954 | A | 7/1990 | Walzer et al. |
| 5,688,207 | A | 11/1997 | Uchida et al. |

(Continued)

FOREIGN PATENT DOCUMENTS

| | | |
|---|---|---|
| DE | 19515534 A1 | 11/1995 |
| DE | 10024034 A1 | 1/2001 |

(Continued)

*Primary Examiner* — Yuen Wong
(74) *Attorney, Agent, or Firm* — Leydig, Voit & Mayer, Ltd.

(57) ABSTRACT

A method for adaptively setting a shift point of a multi-speed powershift transmission of a working machine that includes an electric drive system and a control device. The electric drive system has a battery and an electric motor. The multi-speed powershift transmission is connected to the electric drive system. The control device is connected to the electric drive system and the multi-speed powershift transmission in a signal-effective manner. The method includes specifying a tractive force which must be present during shifting operations of the multi-speed powershift transmission, determining a state variable of the electric drive system, and determining based on the state variable and the specified tractive force, a driving speed at which the specified tractive force is essentially maintained during the shifting operation. The method includes setting the shift point at the determined driving speed and carrying out the shifting operation at the shift point.

7 Claims, 3 Drawing Sheets

Legend
110 Specifying tractive force
120 determining state variable
130 determining driving speed
140 setting shift point
150 carrying out shifting operation Z; S tractive force and shifting operation
G: SOC State of charge as state variable
v Driving speed
P Shift point
S Shifting operation

(51) Int. Cl.
 *F16H 59/44* (2006.01)
 *F16H 59/50* (2006.01)
 *F16H 61/00* (2006.01)

(52) U.S. Cl.
 CPC .............. *F16H 59/44* (2013.01); *F16H 59/50* (2013.01); *F16H 2061/0087* (2013.01); *F16H 2061/0223* (2013.01)

(56) References Cited

U.S. PATENT DOCUMENTS

| | | | |
|---|---|---|---|
| 6,220,987 | B1 | 4/2001 | Robichaux et al. |
| 6,360,154 | B1 | 3/2002 | Krenn et al. |
| 6,932,737 | B2 | 8/2005 | Grassl et al. |
| 2015/0367840 | A1 | 12/2015 | Yang |

FOREIGN PATENT DOCUMENTS

| | | | | |
|---|---|---|---|---|
| DE | 19940703 | C1 | 5/2001 | |
| DE | 10117162 | A1 | 10/2002 | |
| DE | 102015101218 | A1 | 12/2015 | |
| DE | 102020001600 | A1 | 9/2021 | |
| EP | 0339202 | A2 | 11/1989 | |
| EP | 3566919 | A1 | 11/2019 | |
| GB | 2350162 | A * | 11/2000 | ............. F16H 61/10 |
| WO | WO 2002006072 | A1 | 1/2002 | |

\* cited by examiner

Legend
110 Specifying tractive force
120 determining state variable
130 determining driving speed
140 setting shift point
150 carrying out shifting operation Z ; S tractive force and shifting operation
G: SOC State of charge as state variable
v Driving speed
P Shift point
S Shifting operation

METHOD FOR ADAPTIVELY DETERMINING A SHIFTING POINT OF A MULTI-GEAR POWERSHIFT TRANSMISSION OF A WORKING MACHINE, CONTROL UNIT, COMPUTER PROGRAM PRODUCT AND WORKING MACHINE

CROSS REFERENCE TO RELATED APPLICATIONS

This application is a U.S. National Phase application under 35 U.S.C. § 371 of International Application No. PCT/EP2023/053568, filed on Feb. 14, 2023, and claims benefit to German Patent Application No. DE 10 2022 201 606.8, filed on Feb. 16, 2022. The International Application was published in German on Aug. 24, 2023 as WO 2023/156361 A1 under PCT Article 21(2).

FIELD

The present invention relates to a method for adaptively setting a shift point of a multi-speed powershift transmission of a working machine, a control device, a computer program product and a working machine.

BACKGROUND

A gear shifting, particularly a downshifting in a multi-speed powershift transmission of a working machine, requires additional power from a prime mover driving the working machine in order to compensate for rotor inertia of the prime mover. In the field of battery-electric driven working machines, the prime mover is an electric motor. The drivetrains of these battery-electrically powered machines can have an electric motor and a transmission with at least two shift stages that is mechanically connected to it. A corresponding gear can be selected based on a driving requirement and a characteristic map of the electric motor. Hereby the gears can overlap considerably in terms of speed and tractive force of the working machine.

A drive device for machines and vehicles is known from EP 0339202 A2, in which a special shifting behavior is achieved when shifting down to a lower gear.

SUMMARY

In an embodiment, the present disclosure provides a method for adaptively setting a shift point of a multi-speed powershift transmission of a working machine, wherein the working machine comprises the multi-speed powershift transmission, an electric drive system and a control device. The electric drive system has a battery and an electric motor. The multi-speed powershift transmission is operatively connected to the electric drive system. The control device is connected to the electric drive system and the multi-speed powershift transmission in a signal-effective manner. The method comprises specifying a tractive force which must be present during shifting operations of the multi-speed powershift transmission, determining a state variable of the electric drive system, and determining based on the state variable and the specified tractive force, a driving speed of the working machine at which the specified tractive force is essentially maintained during the shifting operation. The method further comprises setting the shift point at the determined driving speed and carrying out the shifting operation at the shift point when the working machine has the determined driving speed.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
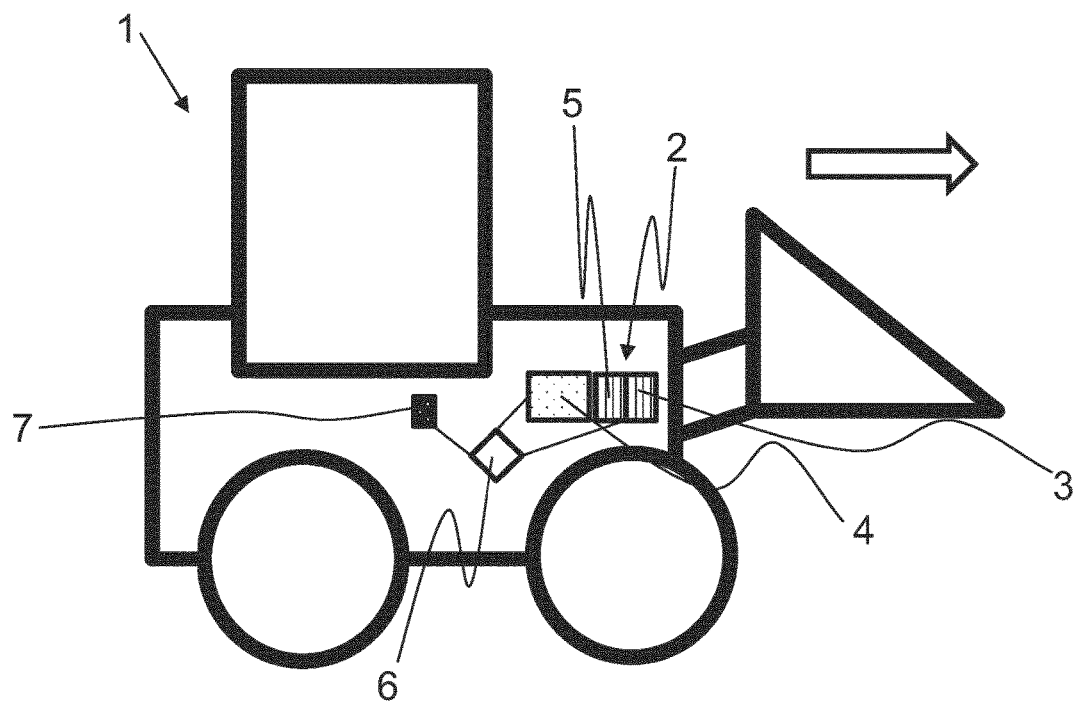
FIG. 1 schematically illustrates a working machine according to an exemplary embodiment.

In an embodiment, the present invention provides an improved method for setting the shift points of a multi-speed powershift transmission.

Based on the foregoing, the present disclosure provides a method for adaptively setting a shift point of a multi-speed powershift transmission of a working machine, a control device, a computer program product and a working machine.

In a method for adaptively setting a shift point of a multi-speed powershift transmission of a working machine, wherein the working machine has the multi-speed powershift transmission, an electric drive system and a control device, wherein the electric drive system has a battery and an electric motor, wherein the multi-speed powershift transmission is operatively connected to the electric drive system, wherein the control device is connected in a signal-effective manner to the electric drive system and the multi-speed powershift transmission, a tractive force which must be present during shifting operations of the multi-speed powershift transmission is specified. A state variable of the electric drive system is determined. Based on the state variable and the specified tractive force, a driving speed of the working machine is determined at which the specified tractive force is essentially maintained during the shifting operation. The shift point is set at this determined driving speed. The shifting operation is carried out at the shift point when the working machine reaches the determined driving speed.

The working machine can be configured as a vehicle that is configured to perform at least one work task that is not intended for transporting people and/or goods. For this purpose, the working machine can have a work device and/or a work tool. For the drive of the work device, the working machine can have a work drive. The working machine can be a construction machine and/or an agricultural machine. For example, the working machine can be a wheel loader, a tractor, a concrete mixer, a waste disposal truck, a forklift truck, a refrigerated truck, etc. The working machine can be a conventional or an automatically operatable working machine that can be controlled remotely. The automatically operatable working machine can be configured as an autonomous working machine.

The working machine has the electric drive system, which in turn has the battery and the electric motor. The battery is connected to the electric motor in an energy-effective manner. In this context, energy-effectively connected means that the battery can supply the electric motor with energy when the electric motor is operated in motor mode and that the battery can be supplied with energy by the electric motor when the electric motor is operated in generator mode, e.g. in recuperation mode. The electric motor is preferably configured as a permanent-magnet electric motor and is used to provide a drive of the working machine. The battery forms an electric energy storage unit. The electric drive system can also have more than one electric motor, for example a first electric motor that can provide a drive of the working machine and a second electric motor that can provide an auxiliary drive for operating the work device or the work tool.

The working machine also has the multi-speed powershift transmission. The multi-speed powershift transmission is used to transmit the speed provided by the electric motor. For this purpose, the multi-speed powershift transmission is operatively connected to the electric drive system. More precisely, the multi-speed powershift transmission is operatively connected to the electric motor. The working machine can have one or more driven axles. Each driven axle can be connected to the electric motor via the multi-speed powershift transmission and can be driven via the multi-speed powershift transmission. In particular, the multi-speed powershift transmission can be used to change the speed ratio between the electric motor and the driven axle. Alternatively or in addition to driven axles, individual wheels can also be driven.

The working machine also has the control device. The control device is preferably configured as an ECU. The control device is connected to the electric drive system and the multi-speed powershift transmission in a signal-effective manner. In this context, "signal-effectively connected" means that the control device is connected to the multi-speed powershift transmission and to the electric drive system in such a way that data and signals can be exchanged. The control device is configured to select a transmission ratio of the multi-speed powershift transmission depending on the shift point set by the method according to the present disclosure. In other words, the control device can control the multi-speed powershift transmission so that a gear can be changed, i.e. upshifted or downshifted. The control device is further configured to receive and evaluate sensor-determined data and signals from the electric drive system, i.e. from the battery and/or from the electric motor. Furthermore, the control device has a memory unit on which data can be stored and/or saved.

In a first step of the method, the tractive force that must be present during shifting operations of the multi-speed powershift transmission is specified. This specified tractive force is stored in the memory unit of the control device. The tractive force or performance can represent the power of the electric motor that can be provided in a continuous operating mode of the electric motor. Thereby a peak performance can represent the maximum tractive force that is available by means of the electric motor. Preferably, the maximum tractive force that must be present during shifting operations of the multi-speed powershift transmission is specified as the tractive force in this first step. This means that the maximum tractive force should preferably be available for each shifting operation, so that the user of the working machine does not feel any drop in tractive force during operation. The tractive force is therefore kept constant during operation of the working machine, preferably constant at the value of the maximum tractive force.

The state variable of the electric drive system is determined. This state variable is determined using suitable sensory equipment and transmitted to the control device. The respective sensors are thus connected to the control device in a signal-effective manner so that data and signals can be exchanged. The control device can evaluate the data and/or signals provided by the sensory equipment. Alternatively, the evaluation is carried out by the corresponding sensors.

The state variable of the electric drive system can, for example, be configured as a state variable of the battery, e.g. as the charge state of the battery. Thereby the charge state of the battery indicates the amount of energy stored in the battery that can be made available to the electric motor. The charge state of the battery has a direct influence on the power of the electric motor, because through this the voltage available to the electric motor is provided. The charge state of the battery changes during operation of the working machine and therefore during operation of the electric motor over the operating time.

Based on the state variable and the specified tractive force, the driving speed of the working machine is determined at which the specified tractive force is essentially maintained during the shifting operation. "Essentially maintained" here means that the tractive force only drops so minimally during the shifting operation that this is not noticeable for the user of the working machine. Preferably, the tractive force is maintained exactly during the shifting operation and does not collapse.

The driving speed is determined by means of the control device. Using an algorithm, the control device calculates the speed at which the shifting operation can take place for a given state variable and specified tractive force, so that the specified tractive force is essentially maintained or even exactly maintained. The shift point is set by the control device at this determined driving speed. The shifting operation is carried out at the shift point when the working machine has the determined driving speed. The shifting operation takes place when the current driving speed of the working machine reaches the determined driving speed. Thus a higher or lower gear can be selected as required. The current driving speed is determined by means of a suitable sensory equipment, e.g. by means of a speed sensor, whereby this sensory equipment is connected to the control device in a signal-effective manner.

For example, with a battery charge level of 100% and a specified maximum tractive force, a gear shifting can take place at 17 km/h, for example. The shift point is therefore set at 17 km/h. However, if the battery charge level is only 10% and the maximum tractive force is specified, the shift point is shifted towards a lower speed, for example to 10 km/h. This means that the gear shifting takes place when the working machine has a driving speed of 10 km/h. The maximum tractive force is thereby essentially maintained. The numerical values are purely by way of example and should not be understood as limiting.

The advantage of the method presented here is that the drop in tractive force is kept as low as possible and/or is minimized. The tractive force remains the same or almost the same for the user of the working machine despite the shifting operation and no loss of performance need be accepted. The disadvantages caused by a drop in tractive force, such as unsteady driving behavior or insufficient power supply of the work equipment to perform the necessary work, can thus be avoided.

The control device for the working machine comprises means for carrying out the steps of the method already described in the previous description. The control device is connectable to the multi-speed powershift transmission and the electric drive system of the working machine in a signal-effective manner. When used in a working machine, the control device is thus connected to the multi-speed powershift transmission and to the electric drive system of the working machine in a signal-effective manner. This has already been described in the previous description. In order to be able to establish these connections, the control device has interfaces via which a signal-effective connection can be made possible.

In addition, the control device is configured in such a way that it can be connected to sensors in a signal-effective manner when used in a working machine, e.g. to sensors for determining the current speed of the working machine. For this purpose, the control device has at least one further interface.

Furthermore, the control device has a memory unit on which data can be stored and/or saved. This has also been described in the previous description. The control device can make use of a computer program product to carry out the method.

Based on the determined driving speed, the control device controls the multi-speed powershift transmission in order to initiate a shifting operation at this very driving speed. This has already been described in the previous description.

The computer program product comprises instructions which, when the program is executed by the control device, cause the control device to perform the method already described in the previous description. The computer program product can comprise a program code containing these instructions. The program code can, for example, be embodied on a data carrier or as a downloadable data stream.

The working machine has a multi-speed powershift transmission, an electric drive system and a control device which has already been described in the previous description. The control device is connected to the multi-speed powershift transmission and the electric drive system in a signal-effective manner. This has also already been described. The working machine is preferably configured as a wheel loader or front loader.

Various embodiments and details of the invention are described in more detail in the following figures.

FIG. 1 shows a schematic illustration of a working machine 1 according to an exemplary embodiment. The working machine 1 here is a wheel loader with a bucket as a work tool. The working machine 1 has an electric drive system 2. The electric drive system 2 has a battery 3 and an electric motor 5. The electric motor 5 and the battery 3 are connected to each other in an energy-effective manner. The working machine 1 also has a multi-speed powershift transmission 4. The multi-speed powershift transmission 4 is operatively connected to the electric drive system 2. The multi-speed powershift transmission 4 is operatively connected to the electric motor 5 of the electric drive system 2. The working machine is driven by the electric drive system 2 so that it can move along a path. This is indicated by the longitudinal arrow.

The working machine 1 also has the control device 6. The control device 6 is connected to the multi-speed powershift transmission 4 in a signal-effective manner and can control it. The control device 6 is connected to the electric drive system 2, more specifically to the battery 3 of the electric drive system 2 and to the electric motor 5 of the electric drive system 2. The control device 6 can query the charge state of the battery 3. The control device 6 can also query a current speed of the working machine 1 from a speed sensor 7 to which it is connected in a signal-effective manner. The method 100 shown in FIG. 4 runs on the control device 6.

Figure 2:
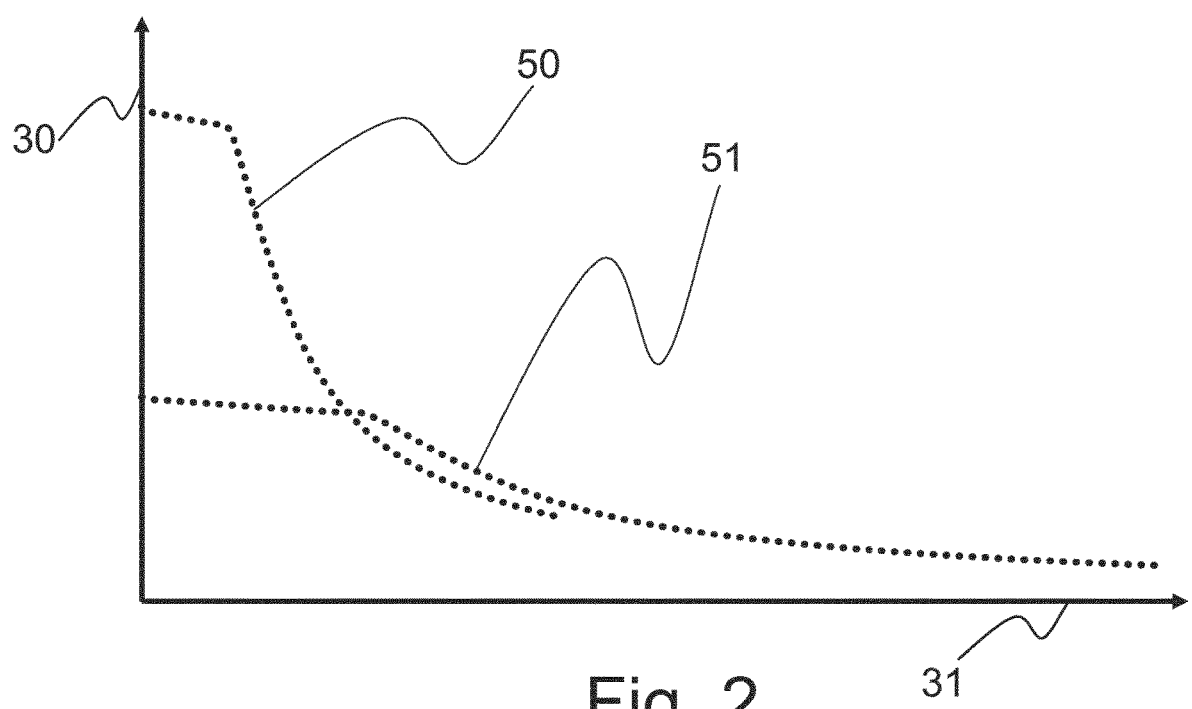
FIG. 2 schematically illustrates a tractive force-speed diagram of a multi-speed powershift transmission of the working machine from FIG. 1.

FIG. 2 shows a schematic illustration of a tractive force-speed diagram of the multi-speed powershift transmission of the working machine from FIG. 1. The speed of the working machine is shown on the abscissa 31. The tractive force of the working machine is shown on the ordinate 30. The course of the tractive force over the speed in first gear 50 and in second gear 51 is shown as an example.

It can be clearly seen that there is a larger overlap range of both gears 50, 51. This makes it possible to adaptively select the shift point for changing between the two gears 50, 51.

Figure 3:
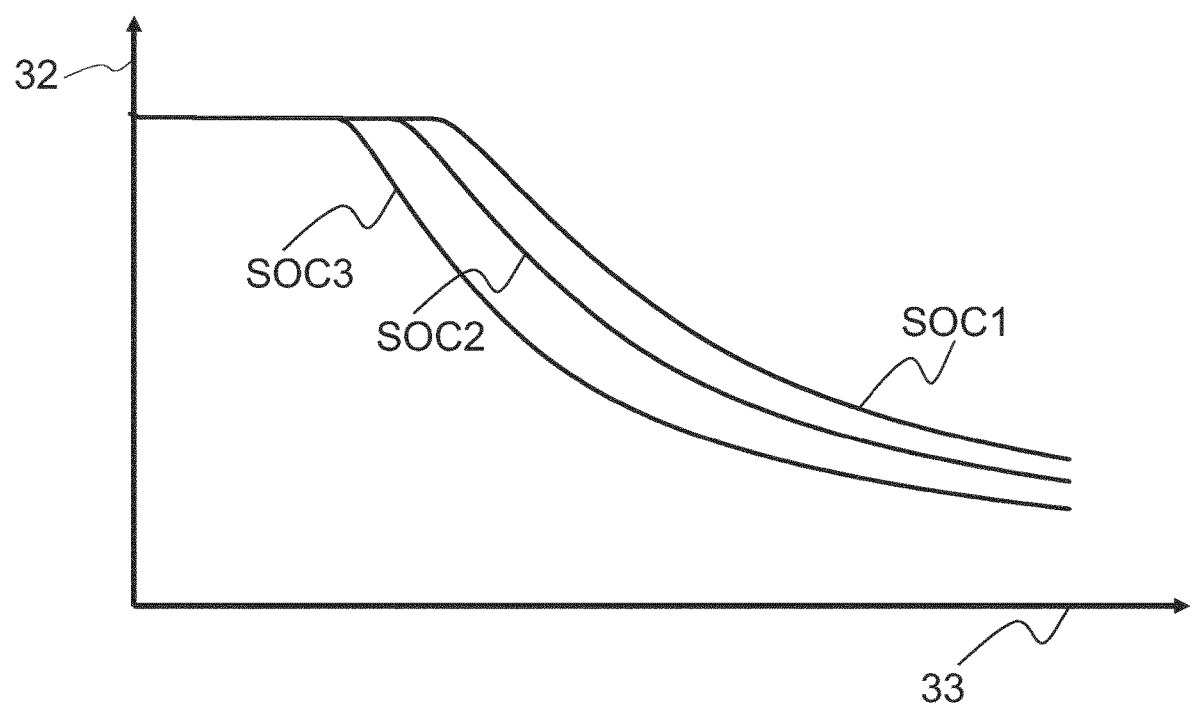
FIG. 3 schematically illustrates a torque-speed diagram of the working machine from FIG. 1.

FIG. 3 shows a schematic illustration of a torque-speed diagram of the working machine from FIG. 1. The motor speed is plotted on the abscissa 33. The torque is plotted on the ordinate 32. Three tractive force curves are shown, each with a different charge state of the battery SOC1, SOC2, SOC3 at a constant magnet temperature of the permanent magnets of the electric motor. Due to the different charge states of the battery SOC1, SOC2, SOC3, a different voltage is available to the electric motor in each case. The state is shown when the method according to an embodiment of the invention is not used.

The first tractive force curve relating to the first charge state SOC1 is shown as an example for a magnet temperature of 100° C. and a voltage of 750V. The second tractive force curve relating to the second charge state SOC2 is shown as an example for a magnet temperature of 100° C. and a voltage of 650V. The third tensile force curve relating to the third charge state SOC3 is shown as an example for a magnet temperature of 100° C. and a voltage of 520V. The numerical values here are purely exemplary and are not to be understood as limiting.

From the diagram it can be seen that when the charge state SOC1, SOC2, SOC3 decreases and therefore the voltage available to the electric motor decreases, but the magnet temperature remains the same, there is a drop in tractive force.

Figure 4:
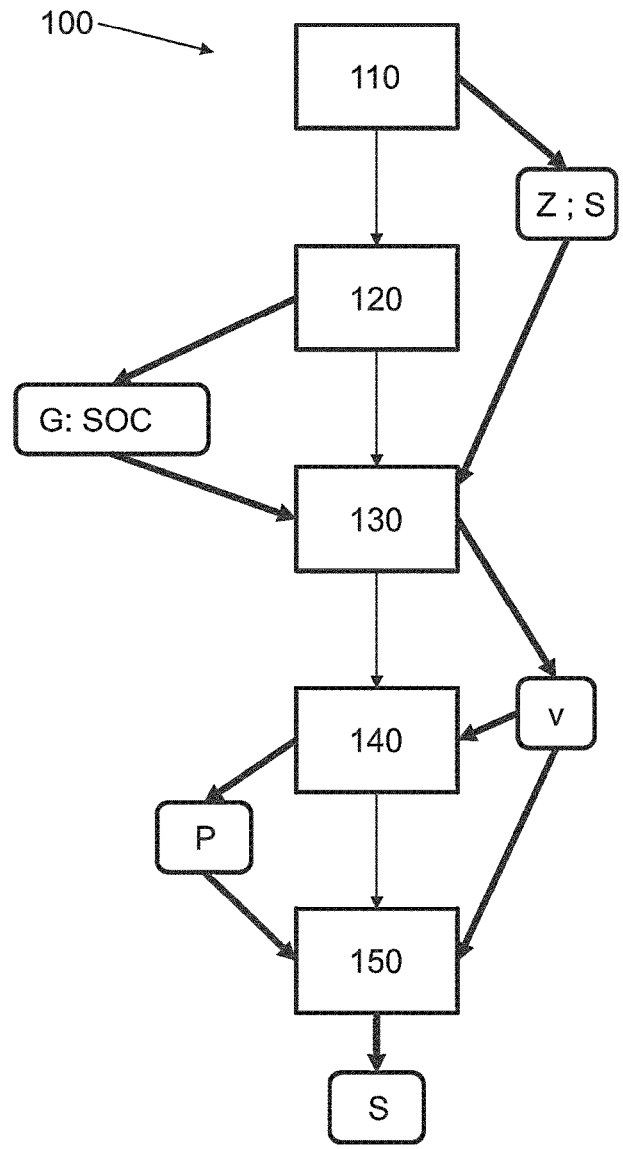
FIG. 4 schematically illustrates a method for adaptively setting a shift point of the multi-speed powershift transmission of the working machine from FIG. 1.

FIG. 4 shows a schematic illustration of the method 100 for adaptively setting a shift point P of the multi-speed powershift transmission of the working machine from FIG. 1.

In a first step 110 of the method 100, the tractive force Z that must be present during shifting operations S of the multi-speed powershift transmission 4 is specified. Preferably, the specified tractive force Z is the maximum tractive force Z that can be available to the working machine.

In a second step 120 of the method 100, a state variable G of the electric drive system is determined. This state variable G can be, for example, the charge state SOC of the battery.

In a third step 130 of the method 100, a driving speed v of the working machine is determined on the basis of the state variable G and the specified tractive force Z at which the specified tractive force Z is substantially maintained during the shifting operation S. This driving speed v is calculated by the control device of the working machine in real time during the operation of the working machine on the basis of the state variable G and the specified tractive force Z.

In a fourth step 140 of the method 100, the shift point P is set at this determined driving speed v.

In a fifth step 150 of the method 100, the shifting operation S is carried out at the shift point P when the working machine has the determined driving speed v. In other words, the shifting operation S is executed when the current driving speed of the working machine reaches the value of the determined driving speed v of the working machine.

The method 100 runs repeatedly and continuously during operation of the working machine. In other words, depending on the determined value of the state variable G, the respective shift point S is always set adaptively.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS 1 working machine
2 electric drive system
3 battery
4 multi-speed powershift transmission
5 electric motor
6 control device
7 speed sensor
30 ordinate—tractive force
31 abscissa—speed
32 ordinate—torque
33 abscissa—motor speed
50 first gear
51 second gear
100 method
110 first step
120 second step
130 third step
140 fourth step
150 fifth step
G state variable
P shift point
SOC charge state
SOC1 first charge state
SOC2 second charge state
SOC3 third charge state
v driving speed
Z tractive force

The invention claimed is:

1. A method for adaptively setting a shift point of a multi-speed powershift transmission of a working machine, wherein the working machine comprises the multi-speed powershift transmission, an electric drive system and a control device, wherein the electric drive system has a battery and an electric motor, wherein the multi-speed powershift transmission is operatively connected to the electric drive system, wherein the control device is connected to the electric drive system and the multi-speed powershift transmission such that data and signals are capable of being exchanged, the method comprising:
    specifying a tractive force which must be present during shifting operations of the multi-speed powershift transmission;
    determining a state variable of the electric drive system;
    determining based on the state variable and the specified tractive force, a driving speed of the working machine at which the specified tractive force is essentially maintained during the shifting operation;
    setting the shift point at the determined driving speed; and
    carrying out the shifting operation at the shift point when the working machine has the determined driving speed.

2. The method according to claim 1, wherein the tractive force which must be present during shifting operations of the multi-speed powershift transmission, is specified as a maximum tractive force.

3. The method according to claim 1, wherein the state variable is configured as a charge state of the battery of the electric drive system.

4. The method according to claim 1, wherein the specified tractive force is maintained exactly during the shifting operation.

5. A control device for a working machine, comprising an electronic control unit (ECU) for carrying out the steps of the method according to claim 1, wherein the control device is configured to be connected to the multi-speed powershift transmission and the electric drive system of the working machine such that data and signals are capable of being exchanged.

6. A computer program product comprising a data carrier with instructions which, when executed by a control device comprising an electronic control unit (ECU), are configured carry out the method according to claim 1.

7. A working machine, comprising:
    a multi-speed powershift transmission;
    an electric drive system; and
    the control device according to claim 5.

* * * * *